United States Patent [19]

Bernard

[11] Patent Number: 5,216,716
[45] Date of Patent: Jun. 1, 1993

[54] TRANSMITTING DEVICE OF SIGNAL SEQUENCES

[76] Inventor: Alain Bernard, 5 rue Jules Simon, 75015 Paris, France

[21] Appl. No.: 777,148

[22] Filed: Oct. 16, 1991

[30] Foreign Application Priority Data

Oct. 17, 1990 [FR] France ............... 90 12804

[51] Int. Cl.[5] .......................... H04L 9/00
[52] U.S. Cl. .......................... 380/23; 380/24
[58] Field of Search .................. 380/23-25; 340/825.31, 825.34

[56] References Cited

U.S. PATENT DOCUMENTS

| | | |
|---|---|---|
| 4,601,011 | 7/1986 | Grynberg . |
| 4,736,419 | 4/1988 | Roe .................. 380/23 |
| 4,928,098 | 5/1990 | Dannhaeuser . |
| 4,998,279 | 3/1991 | Weiss ................ 380/23 |
| 5,056,137 | 10/1991 | Sills ................ 380/9 |
| 5,103,221 | 4/1992 | Memmola ........ 340/825.31 |

FOREIGN PATENT DOCUMENTS 0244332  11/1987  European Pat. Off. .
0385070   9/1990  European Pat. Off. .

Primary Examiner—Salvatore Cangialosi
Attorney, Agent, or Firm—Oblon, Spivak, McClelland, Maier & Neustadt

[57] ABSTRACT

Transmitting device of sequences of acoustic signals. The device comprises a transducer, a generator, a micrologic unit, a memory, a battery and a control means. The device transmits sequences that differ from one transmission to the next. The device has application to an electronic payment method by telephone.

8 Claims, 1 Drawing Sheet

U.S. Patent    June 1, 1993    5,216,716 ated thanks to a counter whose contents are incremented at each use. The contents of this counter determine in part the digital message sent. The device comprises a keyboard for introducing a personal code, which makes it bulky and increases its price. But it is essential in the application described, in particular to make possible the decryption of the transmitted sequence.
TRANSMITTING DEVICE OF SIGNAL SEQUENCES

TECHNICAL FIELD

This invention has as its object to provide a transmitting device of acoustic signals intended to be used as an electronic means of payment for services by telephone.

PRIOR ART

Transmitting devices of acoustic signals of the pocket calculator type able to store and transmit telephone numbers are known. These devices offer the possibility for the user to enter sequences of numbers on a keyboard and to restore them by acoustic coupling on the telephone network. The user can thus retransmit in a repetitive way a sequence of acoustic signals such as a secret code, making it possible for him to consult, on a vocal server, his bank account or his mailbox. Since the code necessary for the transaction is always the same, a person with bad intentions can, by connecting himself to the line, record with a tape recorder the dial tones transmitted and then retransmit them for his personal use.

To eliminate this drawback, other devices have been conceived, particularly for access to a computer by telephone, in which the transmitted sequence changes at each transmission. Thus, document U.S. Pat. No. 4,601,011 provides for changing the sequence transmitted thanks to a counter whose contents are incremented at each use. The contents of this counter determine in part the digital message sent. The device comprises a keyboard for introducing a personal code, which makes it bulky and increases its price. But it is essential in the application described, in particular to make possible the decryption of the transmitted sequence.

Although not having to take into consideration for the evaluation of the inventive activity of the invention which is going to be described, since it is not yet published, French patent application EN 90 04367 of Apr. 5, 1990 in the name of the Applicant (corresponding U.S. application Ser. No. 07/680,851) can be mentioned here, for a better understanding of the present invention, because this application describes an electronic device which also transmits sequences changing over time. The device described in this prior application comprises an acoustic transmitter connected to a control generator able to generate dial tones falling in the telephone band, a memory containing a first identification code and a second code or service key connected to the telephone system in which the device is used, a clock giving the date and determining the purge time of the device. An electronic and logic circuit is connected to the memory and to the clock and controls the generator, this circuit being able to form a message consisting of a sequence of numbers which depend on the first code, the key, and the date indicated by the clock. Each number of this sequence controls the generator for the transmission of a particular dial tone by the acoustic transmitter. The device further comprises a battery able constantly to supply the clock, the memory and the electronic circuit, and a switch controlled manually able to turn on the generator to produce the transmission of the sequence of dial tones.

In this device, the clock has as its object, in particular, to change regularly the sequence transmitted, so that the same sequence cannot be used for too long a time. This system exhibits in certain applications two drawbacks: on the one hand, that of constantly consuming the energy to supply the clock and, on the other hand, that of transmitting the same sequence over the period of time taken as a unit or, if this possibility is eliminated, of imposing the inhibition of transmissions during this period.

Devices are also known of the electronic coin-purse or token-purse type relying on a memory card. But these devices require the use of a specialized card reader and they are therefore not easily used.

Devices are further known by document EP-A-0 244 332 that operate in the infrared region and that are intended to control automobile locks. These devices further comprise a keyboard.

Aside from the devices whose transmitter comprises a keyboard making it possible to enter personalization data, two single control systems are further known which are described in documents EP-A-0 385 070 and U.S. Pat. No. 4,928,098. The first consists in transmitting in a cyclical fashion a sequence of codes stored in a table, but the repetition of these codes, at the end of a certain time, considerably reduces the security of the system. The second is more complex since it consists in transmitting a fixed portion and an encrypted word, the receiver verifying the match between the fixed portion and the encrypted word. This device, which has no monetary or telephone purpose, can be reinitialized by the user by disconnecting the battery. In this case, he retransmits the same signal sequences, except for the variant described in which the user has switches making it possible for him to partially reprogram the fixed word.

DISCLOSURE OF THE INVENTION

This invention specifically has as its object to eliminate these various drawbacks of the prior devices. For this purpose, it proposes a transmitting device of a very great simplicity of structure and use and which is able to generate different sequences from one transmission to the next.

Specifically, this invention has as its object a transmitting device of sequences of signals, comprising:

a transducer able to transmit signals under the control of electric signals, a control generator able to generate sequences of electric signals applied to the transducer, an electronic circuit for control of the generator, comprising particularly a memory where data is prerecorded that is used to define sequences of signals and a logic unit able to form these sequences, a power supply means for the electronic circuit and for the generator, a control means that is accessible by the user of the device, this control means being able to trigger the operation of the electronic circuit for controlling the generator and the transmission by the transducer of a sequence of signals, this device being characterized by the fact that:

the electronic circuit for control of the generator is able to generate sequence of different electric signals at each action on the control means, these sequences being different for different devices, the device thus transmitting sequences of signals that are different from one another at each action on the control means, and the sequences transmitted by one device being different from the sequence transmitted by any other similar device, the transducer transmits acoustic signals having a frequency that is compatible with the telephone band and whose power is suited to their transmission on the telephone system by the microphone of a telephone handset, the memory is provided with an electric connection for introducing data that is used to determine the sequences of signals prior to the delivery of the device to the user, and the electronic circuit is able to define sequences comprising a fixed portion and a variable portion which changes at each action on the control means.

The sequences of electric signals (or at least their variable portion) can be calculated at each transmission by an algorithm which is incremented at each new command. The algorithm can use varied key processes, each device then being provided with a varied key.

But these sequences, (or at least their variable portion) can alternatively be stored in a memory, each record corresponding to an action on the control device, being able to be read only once.

DETAILED DESCRIPTION OF THE PREFERRED EMBODIMENT

Figure 1:
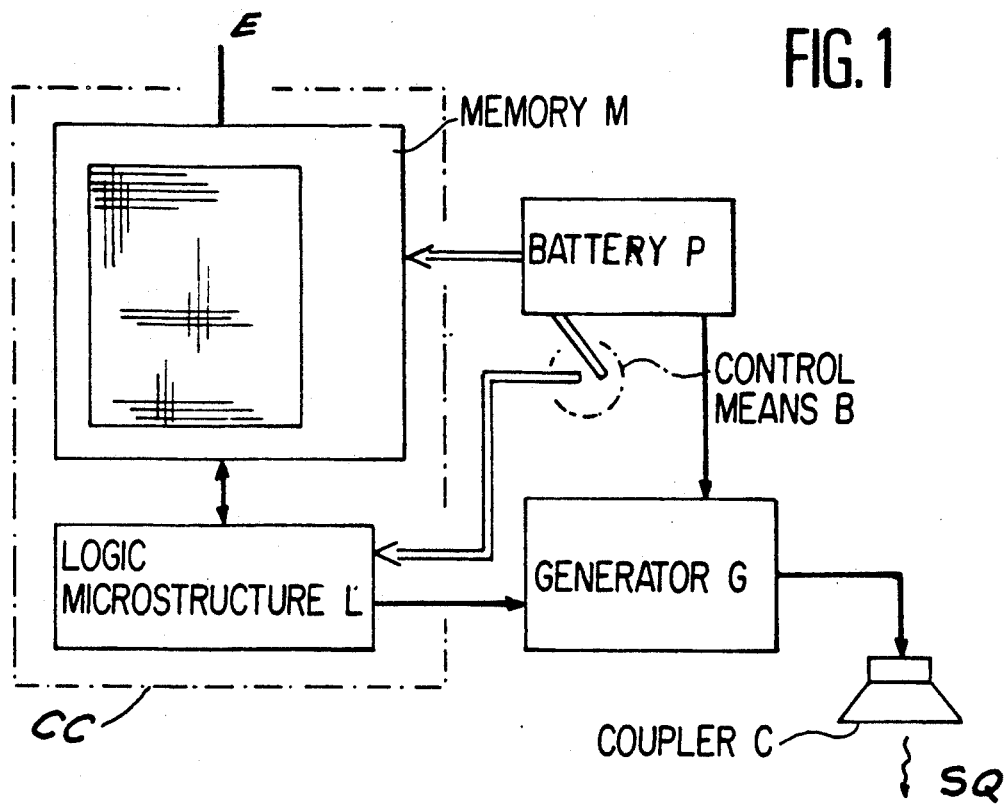
FIG. 1 shows a block diagram of the device.

The device represented in FIG. 1 comprises: a transducer or coupler C, which has as its object to transmit the sequence of acoustic signals SQ. An acoustic coupler can consist of a small metal cup in the center of which a piezoelectric transducer is glued. It is also possible to use a small speaker.

The device further comprises a generator G able to generate sequences of electric signals able to control transducer C. By way of example, it is possible to use a generator of electric signals in the telephone band such as the PCD 3311 circuit which produces signals that make it possible to transmit dial tones in accordance with code Q23 of the CCITT.

Electronic circuit CC for control of generator G comprises a logic microstructure L able to furnish generator G a sequence of data that is produced from information stored in a memory M. This microstructure L can consist of any logic circuit such as a microprocessor. Optionally, it is possible to use microcontrollers such as the TCM 8305 which possesses not only the capacity to transmit telephone signals but also the capacity to seek sequences of signals in an outside memory. Microstructure L and generator G and optionally memory M are then merged on the same chip, of silicon for example.

The device further comprises one or more batteries able to supply means M, G, L and C.

The user has a control mean B that acts by pressure or by contact and which is able to trigger the production of the sequences from data stored in memory M.

Memory M is further provided with a data input means E, prior to turning on the device.

Under the control of means B, the device transmits a sequence of signals but it never transmits, from one time to the next, the same sequence of signals.

Figure 2:
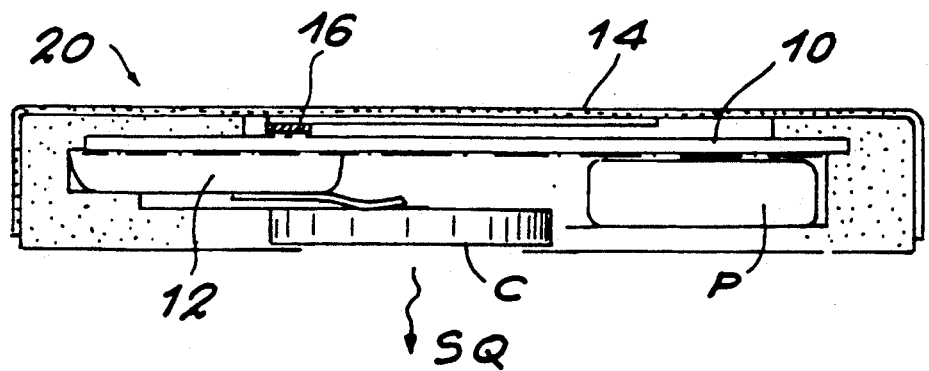
FIG. 2 represents a diagrammatic view in section of the device.
Figure 3:
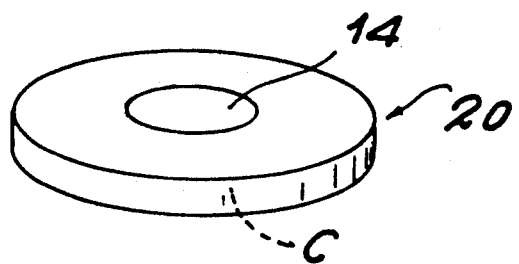
FIG. 3 shows the general shape of the device in the case of an embodiment in the token form.

An embodiment intended to be used on the telephone system can, according to the diagram of FIG. 2, consist of a printed circuit 10 carrying on its lower face battery P and integrated circuits 12 necessary for operation. On its upper face, the circuit carries a push button 14 for control as well as contacts 16 that make it possible to furnish implementation data to the logic circuits.

According to an embodiment of the invention, the various sequences of data to be transmitted are stored in an accompanying memory such as an EPROM or a static RAM and a different record is read at each command. In this embodiment, the number of sequences that a device can transmit is therefore limited by the size of the memory since a record is read only once.

Another characteristic of the invention is that different devices transmit different sequences. By way of completely trivial example, a first device will be able to transmit the numbers from 1 to 1000, a second device will be able to transmit the numbers from 1001 to 2000, a third from 2001 to 3000 and so on. At the first command, the first device will transmit the digit 1, at the second the digit 2, etc. There will thus have been created a family of device, which, provided that they are not used more than 1000 times each, will be able to be easily differentiated from one another and will never transmit the same frequency.

It is obvious that a wise choice of the sequence transmitted by each device makes it possible to prevent an individual from being able to guess the sequences which remain to be transmitted. For example, it is possible randomly to mix up, during the production or turning on of the devices, the sequences that are to be transmitted by noting the list and optionally the order of the sequences entered into each device.

If the device of the invention is used in the application described in French patent application No. 90 0468 already cited, sequences SQ transmitted by the device according to the invention exhibit characteristics that make it possible to associate an account number with each device. It is then possible to associate with the device, either a monetary face value, or a number of account units and to make it change with the line of transactions as described in said application. It is possible also to associate with the device a purge date which can be either stored in the computer managing the accounts with the list of the sequences of each device, or transmitted by the device with each sequence.

A variant of the invention consists actually in making devices which transmit different sequences at each command, but of which one or more portions of the sequence transmitted are constant. One solution consists in reading into the memory always the same sequence before seeking the variable sequence in the table. If the fixed sequence represents the purge date, one thus has the means to transmit this purge date.

Another variant of the invention consists in calculating a sequence, from a function of the number of times the command has been pressed. This correspondence between sequence and number must be one-to-one and cause signals of the sequence to vary as much as possible. An encryption algorithm such as the DES (Data Encryption Standard) responds to these conditions.

The key used to make the DES operate can be different in each device. The fixed portion of the message transmitted is then used to find the reference of this key in a table located in the central computer receiving the message. It is then said that a varied key encryption is used.

When the device is used in a payment system, it is convenient to indicate on it its value, before any use, in monetary or service units. Although this value changes with the uses, this solution is allowed for telecards.

To the extent that the system comprises a battery and is not rechargeable since its data is erased when the battery is removed, it is possible to enter a purge date on it.

I claim:

1. A device for transmitting acoustic signals, comprising:

an electronic circuit including a memory, said memory being provided with an electronic connection for introducing data prior to delivery of said device to a user, said data being at least partially specific to said device, said electronic circuit further including means for defining sequences of a plurality of controlling signals, each of said controlling signals having a fixed portion and a variable portion, said variable portion being defined by said partially specific data introduced into said memory, said variable portion changing only upon each use of said device so that the sequences of the controlling signals are also changed only upon each use of the device and wherein the sequences of the defined sequences of controlling signals are specific to said device with respect to other devices of the same type;

a generator connected to said electronic circuit for receiving said controlling signals, said generator comprising means for emitting sequences of electrical signals corresponding to said sequences of controlling signals;

an acoustic transducer connected to said generator and comprising means for transmitting acoustic signals having a frequency in the telephone bandwidth, said acoustic signal being transmitted on a telephone system, the acoustic transducer thus transmitting sequences of acoustic signals corresponding to said sequences of electrical signals;

a control means that is accessible by a user of the device, the control means triggering the operation of said electronic circuit for controlling the generator and the transmitting of said sequence of signals by the transducer; and a power supply means for the electronic circuit and for the generator, wherein each device transmits different sequences of acoustic signals upon each action on the control means, the sequences transmitted by one device being different from the sequences transmitted by another device of the same type.

2. A device according to claim 1, wherein said means for defining the variable portion of the sequences of said controlling signals include means for computing a function of the number of times said control means has been used, said computing being carried out by an encryption algorithm with a key, said key being specific to said device such that a different key is provided for other devices of the same type as said device.

3. A device according to claim 1, wherein said means for defining said variable portion of the sequences of said controlling signals include means for storing all of a plurality of possible variable portions, and means for reading one of said stored variable portions a single time upon each action on said control means.

4. A device according to any one of claims 1, 2 and 3, wherein, when it is new, each device possesses an expressed face value in monetary units.

5. A device according to any one of claims 1, 2 and 3, wherein, when it is new, each device possesses an expressed face value in service units.

6. A device according to any one of claims 1, 2 and 3, wherein said device loses all value on a date defined as a purge date.

7. A device according to claim 6, wherein said purge date is entered in said device.

8. A device according to any one of claims 1, 2 and 3, wherein the device is contained in a flat-shaped box, one face thereof being used for said acoustic transducer and another face thereof being used for said control means.

* * * * *